United States Patent [19]

Johnson et al.

[11] 4,449,633
[45] May 22, 1984

[54] OVENABLE PAPERBOARD CARTON

[75] Inventors: Harold D. Johnson, Bourbonnais, Ill.; Earle C. Sherman, West Monroe, La.; Leonard M. Cooper, Bradley, Ill.

[73] Assignee: Manville Service Corporation, Denver, Colo.

[21] Appl. No.: 104,626

[22] Filed: Dec. 17, 1979

Related U.S. Application Data

[63] Continuation of Ser. No. 963,871, Nov. 27, 1978, abandoned.

[51] Int. Cl.³ .......................... B65D 5/54; B65D 5/68
[52] U.S. Cl. .................................. 206/612; 206/624; 229/43
[58] Field of Search ............... 206/608, 609, 610, 611, 206/612, 624, 625, 626; 229/31 R, 43

[56] References Cited

U.S. PATENT DOCUMENTS

| | | | |
|---|---|---|---|
| 1,311,047 | 7/1919 | Cole | 229/31 R |
| 2,071,949 | 2/1937 | Reich | 229/31 |
| 2,447,243 | 8/1948 | Freel et al. | 229/34 |
| 2,495,807 | 1/1950 | Buttery | 229/34 |
| 2,531,255 | 11/1950 | Clarke | 229/23 |
| 2,628,012 | 2/1953 | Goldsholl | 229/44 |
| 2,973,086 | 2/1961 | Thompson | 206/607 |
| 3,082,928 | 3/1963 | Schenk | 229/19 |
| 3,298,505 | 1/1967 | Stephenson | 206/45.31 |
| 3,301,391 | 1/1967 | Guyer | 206/56 |
| 3,526,353 | 9/1970 | Jaeschke | 206/607 |
| 3,572,576 | 3/1971 | Foster | 229/31 |
| 3,580,466 | 5/1971 | Thelen | 206/607 |
| 3,606,078 | 9/1971 | Phillips, Jr. | 220/62 |
| 3,810,574 | 5/1974 | Gardner | 229/31 FS |
| 3,863,832 | 2/1975 | Gordon et al. | 229/30 |
| 3,876,132 | 4/1975 | Kuchenbecker | 229/27 |
| 3,905,543 | 9/1975 | Randles | 229/31 FS |
| 3,917,155 | 11/1975 | Bemiss | 229/31 R |
| 4,003,514 | 1/1977 | Graser | 229/34 HW |

FOREIGN PATENT DOCUMENTS

| | | | |
|---|---|---|---|
| 98049 | 9/1960 | Denmark | 206/611 |
| 1129223 | 9/1956 | France | 206/625 |
| 489677 | 8/1938 | United Kingdom | 206/607 |
| 1141676 | 1/1969 | United Kingdom | 206/611 |

*Primary Examiner*—Stephen P. Garbe
*Attorney, Agent, or Firm*—Ronald M. Halvorsen; John D. Lister

[57] ABSTRACT

A new and improved ovenable paperboard carton for use in a microwave and conventional oven is disclosed. The improved carton comprises a bottom tray having a plurality of side panels with gusset panels attached thereto and combines the bottom tray with a new and improved upper lid which has a central top panel and a plurality of side panels hingedly attached thereto. The upper lid contains a pair of strategically placed reverse cuts which form a tear-off portion for the carton. The tear-off portion is designed to provide corner reinforcement to the package. When the tear-off portion is removed from the upper lid, a pair of structurally supporting channels are formed along opposite edges of the carton to add stability, with the corner reinforcement, to the package upon removal of the lid. The upper lid is adhesively secured to the bottom tray to further enhance the rigidity of the package.

5 Claims, 15 Drawing Figures

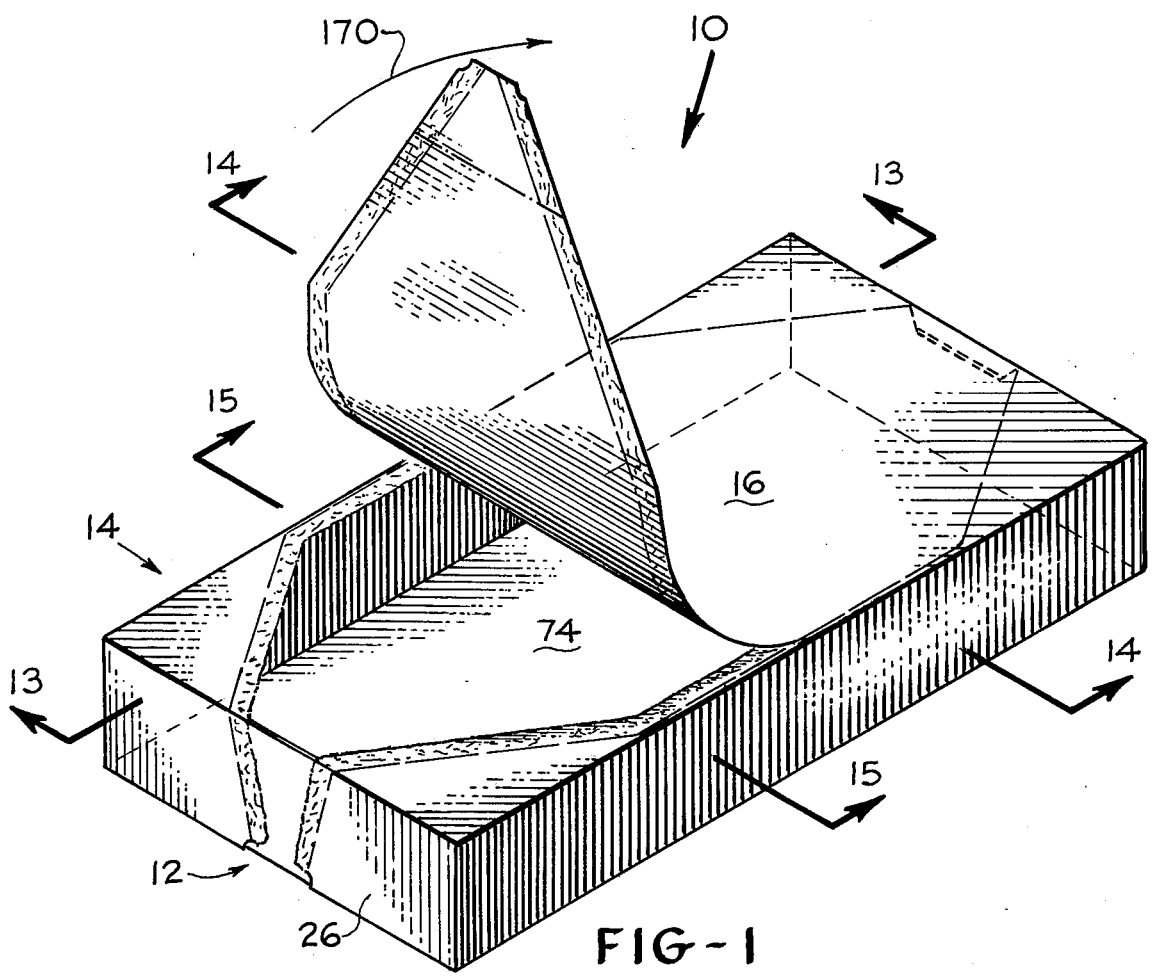
FIG-1
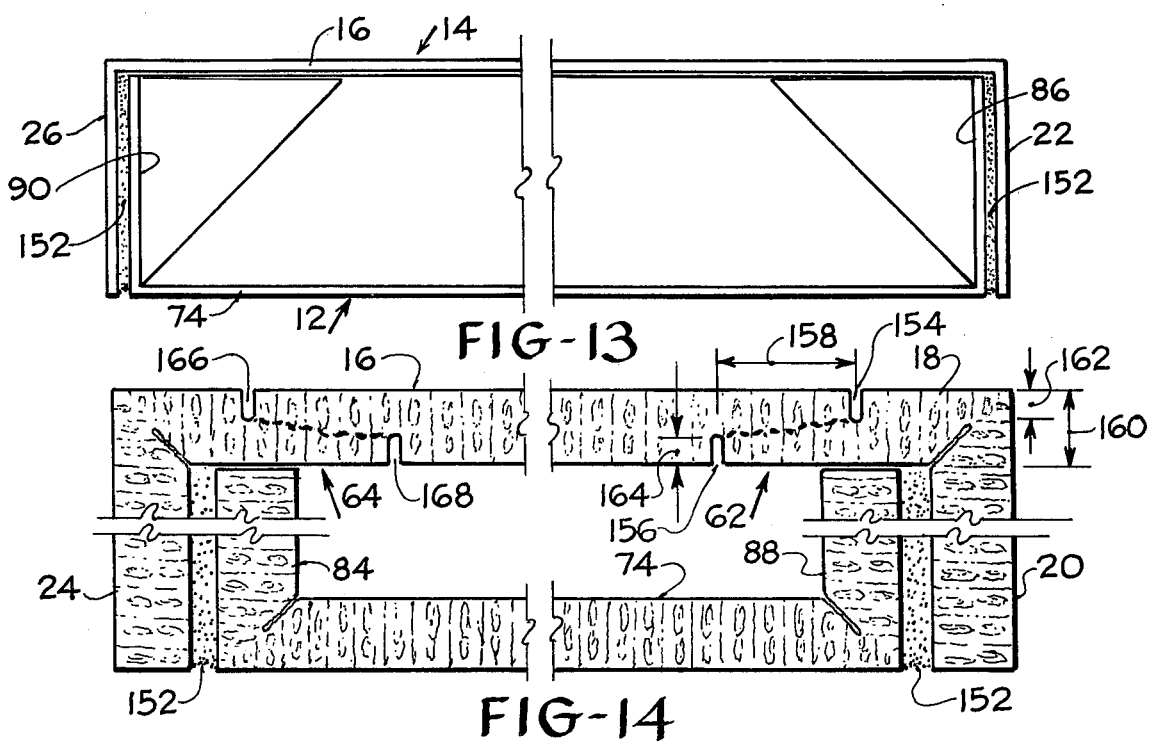
FIG-13
FIG-14

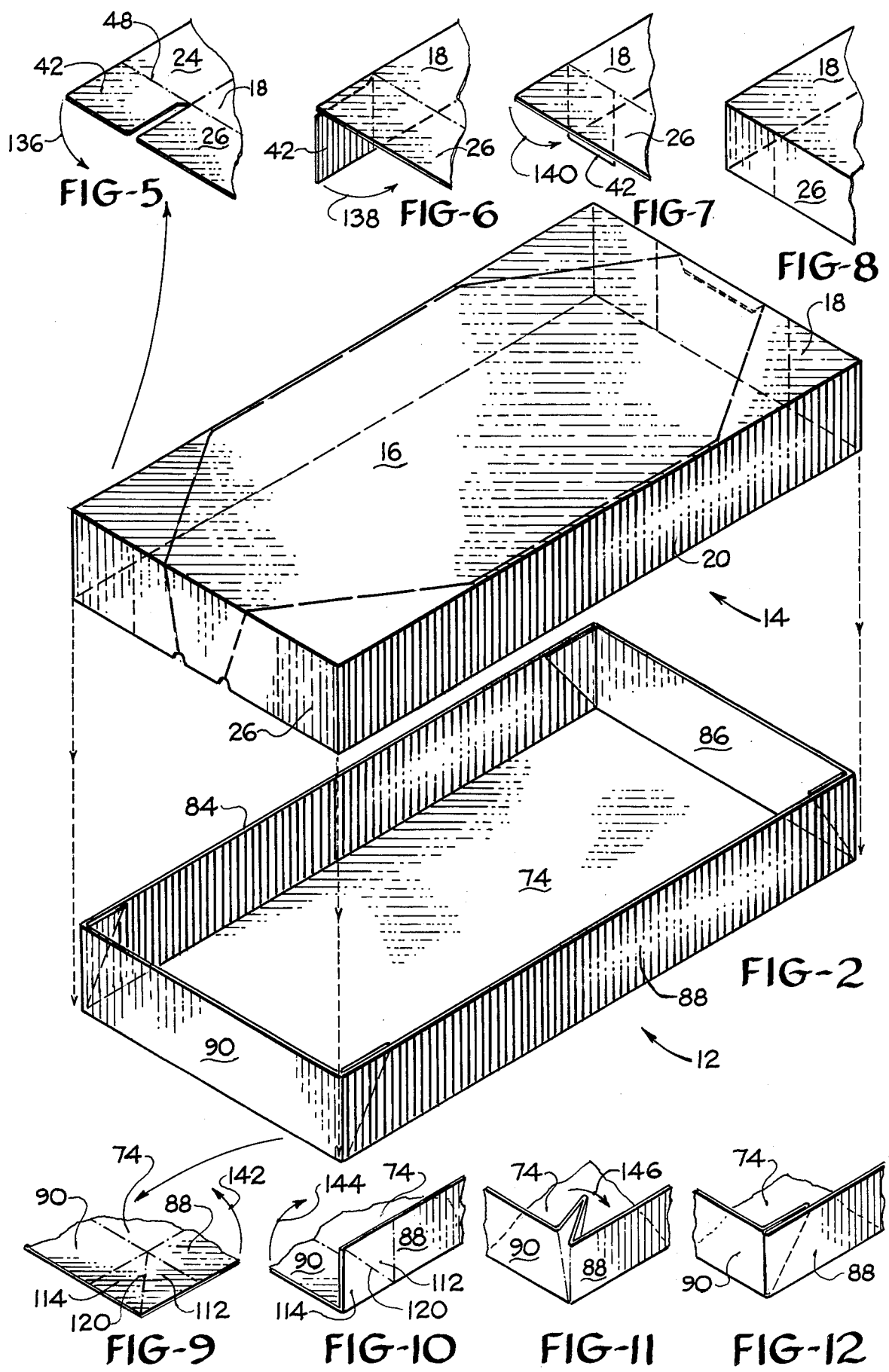

OVENABLE PAPERBOARD CARTON

This is a Continuation of application Ser. No. 963,871, filed Nov. 27, 1978, now abandoned.

BACKGROUND OF THE INVENTION

This invention relates generally to frozen food trays and more particularly to a new and novel improved ovenable paperboard carton of the type having a lid attached which may be used in a microwave and a conventional oven. This versatility of use in either type oven enables the packager of frozen food to eliminate the need for two types of frozen food packages. Use of the new and novel paperboard carton herein disclosed would appeal to the housewife who uses the conventional type oven as well as the housewife who uses the more recent microwave oven.

Many of the prior art frozen food packages are formed from aluminum which, it is believed, cannot be used in today's modern microwave ovens without damaging the radiation element. These aluminum packages are not only restricted to use in conventional ovens but are generally more costly to manufacture than a paperboard carton of the type herein disclosed by the applicant's invention.

Many prior art aluminum type frozen food packages required an inner container in which the frozen food was placed and also an outer paperboard container which not only protected the aluminum container from damage during shipping and storage but which also provided a means for printing the advertising of the packager. Oftentimes the outer paperboard container was not printed itself but had an additional paper layer on which the advertising was printed. Not only did this add to the expense of the package, but it was necessary that the housewife remove the outer paperboard container and additional paper layer before reheating the frozen food contained within the aluminum inner container.

The applicants' new and novel ovenable paperboard carton, having a one-piece lid, is constructed so that it not only provides the structural stability required to protect the contents of the package, but it may also have printed on its exterior portion the packager's advertising thus eliminating the need for an outer package and resulting in a greater cost savings to the packager and the ultimate consumer.

Another problem encountered in today's mechanized world is the speed of packaging. The folding and gluing of the applicant's new and novel ovenable paperboard carton is well suited to today's high speed packaging lines and the elimination of the outer package also increases the speed of packaging and results in even further savings to the packager of frozen food and the ultimate consumer.

Other problems facing the food packaging industry are those of securing a leakproof tray. Many prior art trays were constructed in such a manner that they were leakproof to the extent that contents contained within the tray could not leak to the outside of the tray, but seepage could occur between the interior and exterior walls of the tray. The problem is particularly prevalent in the packaging of foods containing sauces, gravies and the like. Examples of prior art trays of this type are shown in U.S. Pat. No. 2,531,255 issued to J. D. Clarke on Nov. 21, 1950, and U.S. Pat. No. 2,628,012 issued to M. Goldsholl on Feb. 10, 1953.

Other prior art packages are cited herein to show the state of the art and are shown in the U.S. Pat. No. 3,298,505, issued to E. E. Stephenson on Jan. 17, 1967; the U.S. Pat. No. 3,606,078, issued to F. L. Phillips, Jr. on Sept. 20, 1971; the U.S. Pat. No. 3,572,576, issued to Thomas W. Foster on Mar. 30, 1971; the U.S. Pat. No. 3,876,132, issued to Morris W. Kuckenbecker on Apr. 8, 1975; the U.S. Pat. No. 2,071,949, issued to S. Reich on Feb. 23, 1937; the U.S. Pat. No. 3,082,928, issued to R. F. Schenk on Mar. 26, 1963; the U.S. Pat. No. 3,905,543, issued to Arthur E. Randles on Sept. 16, 1975 and the U.S. Pat. No. 3,863,832, issued to Robert L. Gordon et al. on Feb. 4, 1975.

An earlier embodiment of a frozen food tray of the type for use in various ovens in shown in the U.S. Pat. No. 4,003,514, issued to Earl J. Graser on Jan. 18, 1977, and in the prosecution of that case in the U.S. Patent Office there was disclosed other prior art packages which are cited herein to show the further state of the art and were shown in the U.S. Pat. No. 2,447,243, issued to W. G. Freel et al. on Aug. 17, 1978; the U.S. Pat. No. 2,495,807, issued to K. T. Buttery on Jan. 31, 1950; the U.S. Pat. No. 3,301,391, issued to R. Guyer on Jan. 31, 1967; the U.S. Pat. No. 3,810,574, issued to Jeffrey M. Gardner on May 14, 1974 and the U.S. Pat. No. 3,917,155, issued to Robert B. Bemiss on Nov. 4, 1975.

In frozen food ovenable cartons, it is desirable to have rigidity built into the package so that the carton may be more easily removed from the oven. The reason for this is that the contents when frozen add to the rigidity but when thawed, the carton proper must be the sole means of support of the contents.

The poorly designed package will tend to twist when it is removed from the oven since the housewife usually grasps the package at one end. Accordingly, the entire weight of the thawed contents will tend to make the package distort in the housewife's hands. For a pictorial representation of this, reference should be made to FIG. 1A of a patent application filed simultaneously with this one by Earl J. Graser and Earl J. Killy and entitled "Ovenable Paperboard Carton". This application bears the U.S. Ser. No. 963,872 and filing date of Nov. 27, 1978 and is incorporated herein by reference.

SUMMARY OF THE INVENTION

In order to overcome the problems inherent in the prior art structures, there has been provided by the applicants' invention an improved ovenable paperboard carton having a bottom tray combined with an improved upper lid which are fixedly adhered together. The improved upper lid contains a pair of reverse cuts which are strategically positioned on the upper lid so that the reverse cuts form a tear-off portion which, when removed, provides a structurally reinforcing channel along two of the edges of the package adding stability to the package. The tear-off portion is designed to provide corner reinforcement to the package, and the upper lid is glued to the bottom tray to further improve the rigidity of the package.

Accordingly, it is an object and advantage of the invention to provide an improved ovenable paperboard carton that may be utilized in a microwave and a conventional oven and which has a removable tear-off portion on the lid which may be removed without destroying the structural stability of the package.

Another object and advantage of the invention is to provide a new and improved ovenable paperboard carton that may be used in a microwave and a conventional oven and which comprises a unitized package which comprises a new upper lid and a bottom tray which are adhesively secured together and having several improved features contained on the lid to further enhance the stability of the package.

These and other objects and advantages of the invention will become apparent from a review of the drawings of the application and from a detailed study of the preferred embodiment following hereinafter.

BRIEF DESCRIPTION OF THE DRAWINGS

FIG. 1 is a perspective view of the applicants' improved ovenable paperboard carton showing the tear-out portion partially removed from the upper lid;

FIG. 2 is an exploded perspective view showing the applicants' improved ovenable paperboard carton and showing the improved upper lid and the bottom tray prior to being adhesively secured together;

FIGS. 5-8 are partial break-away views of one corner of the applicants' new and improved upper lid showing the folding sequence of the corners of the lid;

FIGS. 9-12 are partial break-away views of one corner of the applicants' bottom tray showing the folding sequence of the corners in setting up the tray;

FIG. 13 is a sectional view, taken along line 13—13 of FIG. 1, showing the placement of the upper lid over the bottom tray and the placement of adhesive between the lid and the tray and further showing the folding and placement of the gusset panels of the bottom tray;

FIG. 14 is an enlarged sectional view, taken along line 14—14 of FIG. 1, showing the placement of the reverse cuts in the upper lid of the applicants' invention.

DESCRIPTION OF THE PREFERRED EMBODIMENT

Figure 3:
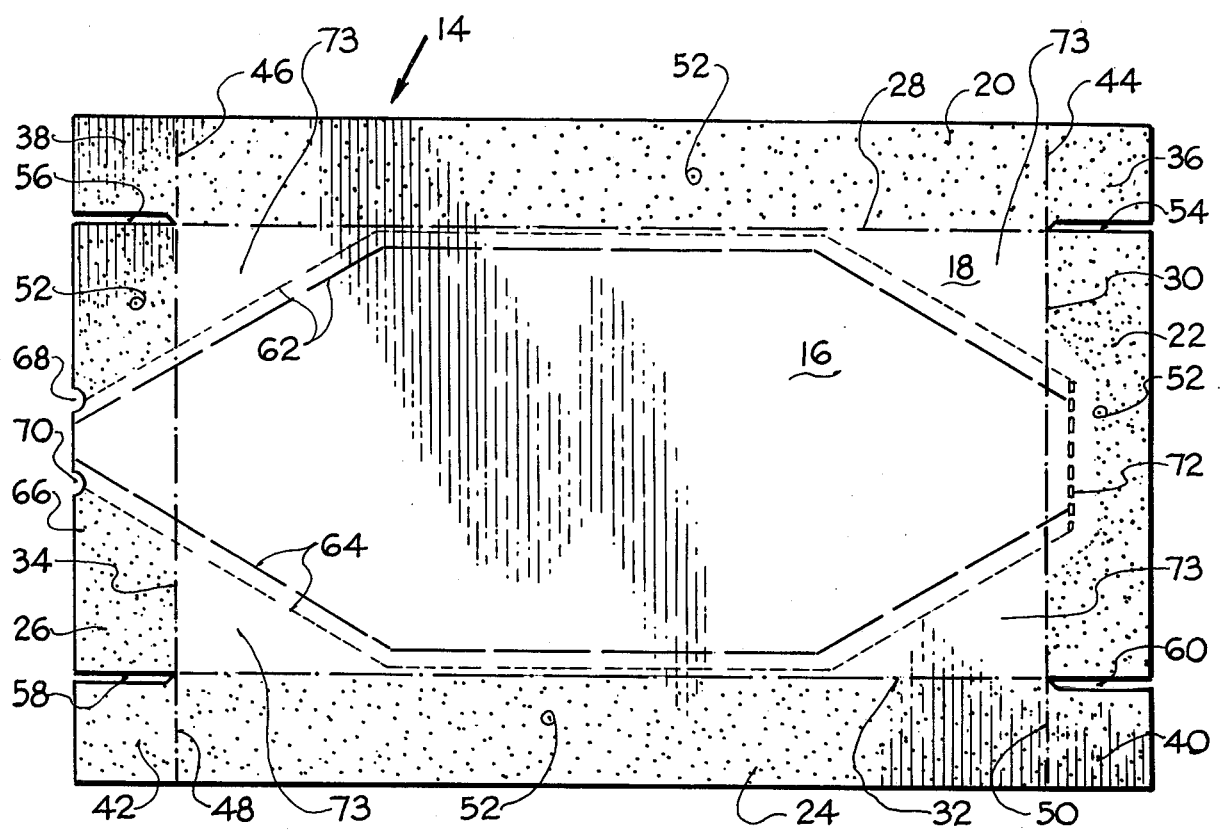
FIG. 3 is a plan view of the underside of the production blank of the applicants' new and improved upper lid showing the adhesive pattern and the formation of the pair of reverse cuts described hereinafter.
Figure 4:
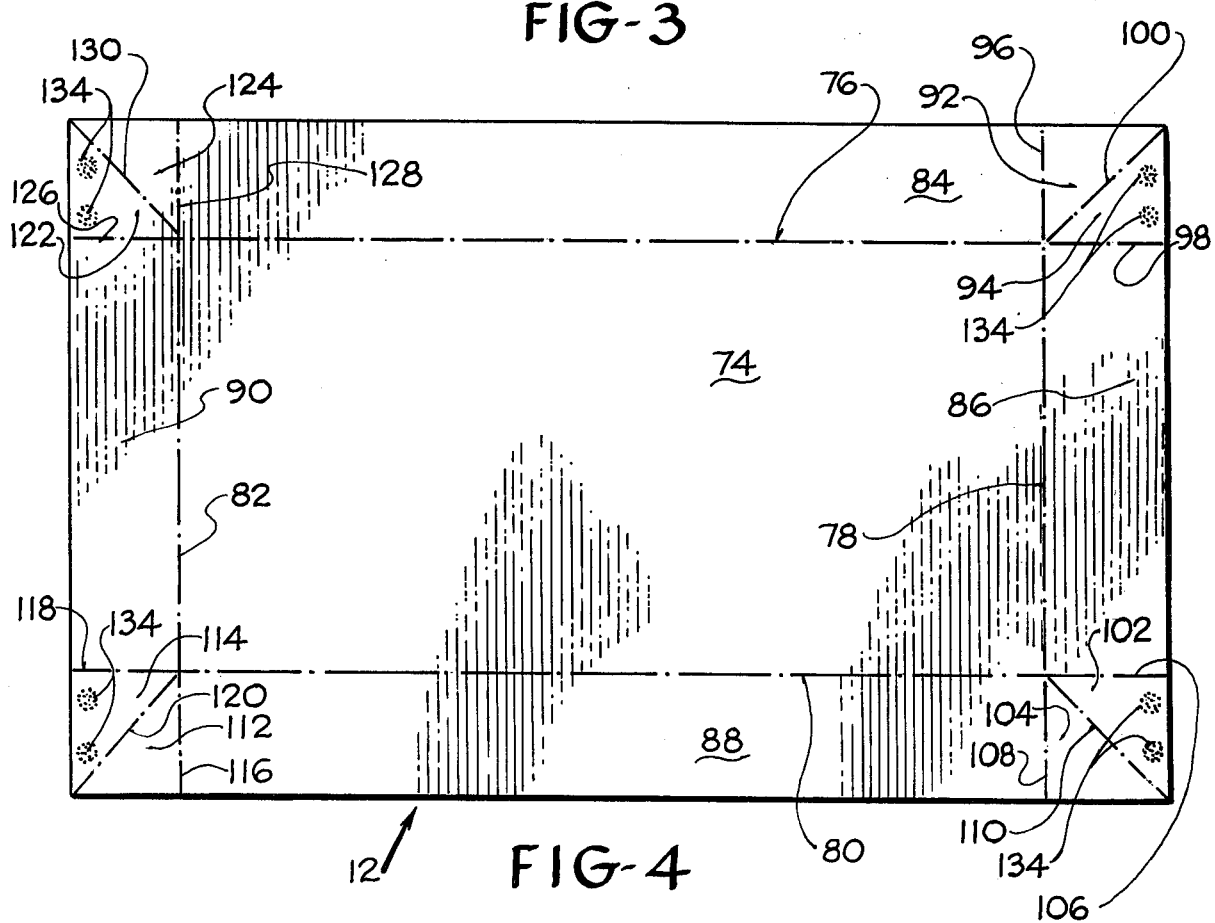
FIG. 4 is a plan view of the outside of the production blank for the applicants' bottom tray of the subject invention showing the placement of the gusset panels.

Referring now to the drawings in general and in particular to FIG. 1 of the drawing there is shown the applicants' new and novel ovenable paperboard carton generally by the numeral 10 which comprises a bottom tray, shown generally by the numeral 12 and also shown more specifically in FIGS. 2 and 4 of the drawing, along with an upper lid, shown generally by the numeral 14, which is shown more specifically in the drawing FIGS. 2 and 3. The upper lid 14 contains a pair of reverse cuts forming a tear-off portion 16 for exposing the contents of the carton 10 either during cooking or after cooking in the oven. The location and function of the reverse cuts will be described more fully hereinafter when referring to other views of the drawing, especially FIGS. 3, 14 and 15.

Referring now to FIG. 2 of the drawing there is shown an exploded perspective view of the carton shown in FIG. 1 of the drawing and further showing the placement of the upper lid over the bottom tray.

The carton shown in FIG. 2 of the drawing has the tear-off portion totally intact as it would be whenever the carton is purchased by the customer.

Referring now to FIG. 3 of the drawing and to FIG. 2 there will be described and shown in greater detail the new and novel features of the applicants' upper lid 14 which comprises a central top panel 18 and having a plurality of top side panels 20, 22, 24 and 26 attached thereto by means of the scorelines 28, 30, 32 and 34 forming hinged connections thereto. In the embodiment shown in FIG. 3 of the drawing, the pair of top side panels 20 and 24 have hingedly attached thereto a plurality of flaps 36, 38, 40 and 42 by means of the scorelines 44, 46, 48 and 50. The flaps 36-42 are adhesively secured to the adjacent top side panels as will be described more fully hereinafter when referring to FIGS. 5-8 of the drawings. It can be seen from FIG. 3 that the flaps 36 and 40 would be adhesively secured to the top side panel 22 while the flaps 38 and 42 would be adhesively secured to the top side panel 26. The adhesive location on the paperboard blank shown in FIG. 3 is shown by the stipling 52 on the various panels and flaps.

The flap 36 is separated from the top side panel 22 by means of the die cut 54 and in a like manner the flap 38 is separated from the top side panel 26 by means of the die cut 56. On the opposite side of the lid, the flap 42 is separated from the top side panel 26 by means of the die cut 58 and the flap 40 is separated from the top side panel 22 by means of the die cut 60.

The entire production blank for the upper lid 14 is formed of paperboard having a suitable coating of the type making it satisfactory for use in both the microwave and conventional type ovens. The central top panel 18 has formed therein the tear-off portion 16 which is formed by means of the previously mentioned pair of reverse cuts 62 and 64 which will be described more fully hereinafter when referring to the remaining drawing figures, especially FIGS. 14 and 15. It is sufficient to say at this point, however, that the reverse cuts 62 and 64 are initiated at the edge 66 of the top side panel 26 in the central portion thereof at the notches 68 and 70 which are spaced apart somewhat as seen in FIG. 3 of the drawing. Thereafter the reverse cuts 62 and 64 run to a portion of an adjacent top side panel 20 and 24 and thereoff run in juxtaposition to the adjacent top side panels 20 and 24 along the scorelines 28 and 32. Thereafter the reverse cuts 62 and 64 are positioned inwardly and terminate in the central portion of the top side panel 22 which is opposite to the top side panel 26 where the reverse cuts initiated. When the reverse cuts 62 and 64 terminate in the top side panel 22 they terminate in a cut scoreline 72 in such a manner that the tear-off portion 16 may be torn from the central top panel 18 so that the tear-off portion may still remain hinged to the top side panel 22 as desired by the customer or it may be totally removed from the upper lid by tearing it along the cut scoreline 72. The cut scoreline 72 is also known in the trade as a perforated score and is formed by separating the steel rule die at predetermined positions that parts of the steel rule die used in forming the score entirely pierce the paperboard carton below the die.

The positioning of the reverse cuts 62 and 64 in the manner shown provides a triangular-shaped corner reinforcement 73 which adds to the structural stability of the package in combination with the reverse cuts and the upper lids' adhesive bonding to the bottom tray.

Referring now to FIG. 4 of the drawing there is shown the applicants' bottom tray 12 of the subject invention which comprises a central bottom panel 74 which has hingedly attached thereto by a plurality of scorelines 76, 78, 80 and 82, a plurality of bottom side panels 84, 86, 88 and 90. Each pair of adjacent bottom side panels has hingedly attached thereto a pair of gusset panels which are hingedly attached to each other and to the bottom side panels. For example, the adjacent bottom side panels 84 and 86 have hingedly attached thereto a pair of gusset panels 92 and 94 by means of the scorelines 96 and 98 with the gusset panels 92 and 94 being hingedly attached to each other by means of the scoreline 100. In a like manner the adjacent bottom side panels 86 and 88 have hingedly attached thereto a pair of gusset panels 102 and 104 by means of the scorelines 106 and 108 while the gusset panels 102 and 104 are hinged attached to each other by means of the scoreline 110.

On the opposite end of the bottom tray, the adjacent pair of bottom side panels 88 and 90 have hingedly attached thereto a pair of gusset panels 112 and 114 by means of the scorelines 116 and 118 while the gusset panels 112 and 114 are hingedly attached together by means of the scoreline 120. And in a like manner, the adjacent bottom side panels 90 and 84 have hingedly attached thereto a pair of gusset panels 122 and 124 by means of the scorelines 126 and 128 while the gusset panels 122 and 124 are hingedly attached together by means of the scoreline 130. Adhesive 134 is used to glue each one of the gusset panels to the side panels when folded as in FIGS. 9-12.

Referring now to FIGS. 5-8 of the drawing there will be described the folding sequence of one of the corners of the upper lid 14 of the applicants' invention. In FIG. 5 it can be seen that the flap 42 attached to the top side panel 24 by means of the scoreline 48 would be folded downwardly as shown by the arrow 136 as would be the top side panel 24. Thereafter the flap 42 would be folded inwardly as shown by the arrow 138 in FIG. 6. Completing the folding sequence, the top side panel 26 would be folded downwardly as shown by the arrow 140 in FIG. 7 and would be adhesively secured to the flap 42 as shown in FIG. 8 of the drawing.

Referring now to FIGS. 9-12 of the drawing, there will be described a folding sequence of one of the corners of the bottom tray 12 of the applicants' invention. In FIG. 9, it can be seen that the side panel 88 as well as the gusset panels 112 and 114 would be folded upwardly as shown by the arrow 142. Thereafter the side panel 90 would be folded inwardly in the direction shown by the arrow 144 in FIG. 10. When folding the side panel 90 inwardly a crease is made in the scoreline 120 so that the gusset panels 112 and 114 take the configuration as shown in FIG. 11 of the drawing. In completing the folding sequence, the gusset panels 112 and 114 are folded toward the bottom side panel 88 as shown by the arrow 146 in FIG. 11 of the drawing. Thereafter the folding sequence is completed when the gusset panels 112 and 114 are adhesively secured to the bottom side panel 88.

Referring now to FIG. 13 of the drawing there is shown a sectional view, taken along line 13—13 of FIG. 1, showing the placement of the upper lid 14 over the bottom tray 12 and further showing the adhesive means 152 which adheres the top side panels of the upper lid to the bottom side panels of the bottom tray whenever the upper lid has been positioned over the bottom tray. It can also be seen in FIG. 13 the folded positions of the gusset panels which are adhesively secured to the side panels.

Referring now to FIG. 14 of the drawing there is shown an enlarged view, taken along line 14—14 of FIG. 1, showing the placement of the reverse cuts 62 and 64 in the upper lid 14 of the applicants' invention. The reverse cuts 62 would be formed by an upper partial die cut 154 and a lower partial die cut 156 which have been spaced apart from each other by the distance shown by the arrow 158. From experimentation it has been found that it is preferable to space the upper partial die cut 154 a distance of approximately $\frac{1}{4}$ inch from the lower partial die cut 156 as shown by the arrow 158. These partial die cuts 154 and 156 would extend into the paperboard central top panel 18 a distance of approximately 40% of the thickness of the central top panel 18. The thickness of the central top panel is shown by the arrow 160 and the depth that the upper partial die cut 154 would extend into the panel thickness is shown by the dimension 162. In a like manner the depth that the lower partial die cut 156 would extend into the paperboard thickness would be shown by the dimension 164.

On the other side of the central top panel 18 the pair of reverse cuts 64 are formed by means of an upper partial die cut 166 and a spaced apart lower partial die cut 168. The spacing and the depth of the partial die cuts 166 and 168 would be similar to those of the partial die cuts 154 and 156.

Figure 15:
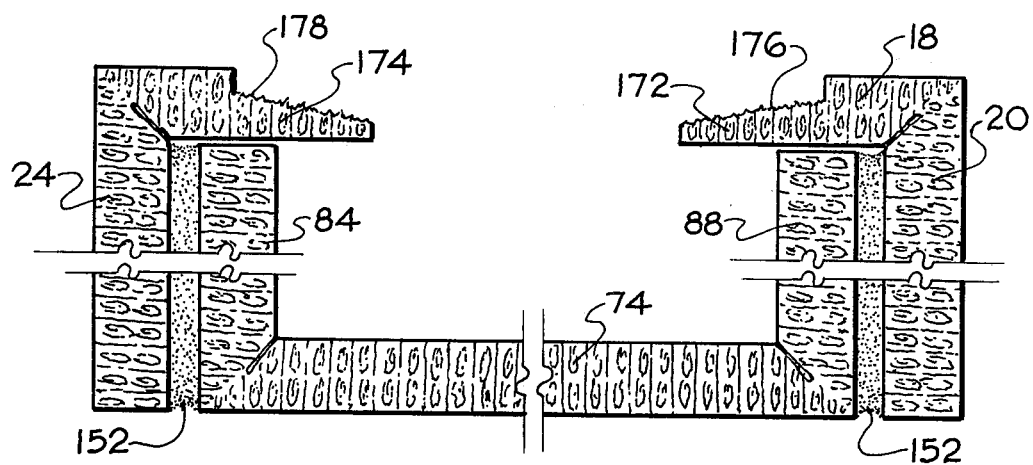
FIG. 15 is an enlarged sectional view, taken along line 15—15 of FIG. 1, showing the tear-out portion of the upper lid being removed from the upper lid and further showing the structural channel along two edges of the carton which adds stability to the carton.

By referring now to FIG. 15 of the drawing there is shown an enlarged sectional view, taken along line 15—15 of FIG. 1, showing the tear-off portion 16 of the upper lid 14 being removed from the upper lid a partial amount and showing the structural channel along two edges of the carton which adds stability to the carton. By forming the partial die cuts 154, 156, 166 and 168 in the manner shown in FIG. 14 and at the depth shown of approximately 40% of the depth of the carton lid, it can be seen that whenever the tear-off portion 16 is removed by tearing it in the direction shown by the arrow 170, in FIG. 1 of the drawing, there is exposed an elongated section 172 and 174 on each side of the carton. Whenever the tear-off portion 16 is removed, the tearing of the central top panel 18 will take place along the jagged edge 176 and 178 leaving the elongated sections 172 and 174. These elongated sections, in combination with the remaining portions of the central top panel 18, form a structural reinforcing channel which gives stability to the package, especially in light of the fact that the top side panels and the bottom side panels are adhesively secured together by means of the adhesive 152. The stability is also enhanced by the use of the triangular-shaped corner reinforcements 73. The channel in combination with the corner reinforcements and glued upper lid add stability to the package whenever it has been packaged with frozen food and after the package is removed from the oven and the tear-off portion 16 is torn from the central top panel 18.

It can be seen from the foregoing that there has been provided a new and improved ovenable paperboard carton having new and improved features which accomplish all of the objects and advantages of the invention. However, it can be seen that many changes may be made in the various arrangements of parts of the applicants' invention without departing from the spirit and scope of the invention and the invention is not to be limited to the exact embodiment shown which has been shown by way of illustration only.

Having described our invention, we claim:

1. An improved ovenable paperboard carton for use in a microwave and conventional oven, comprising:
    (a) a generally rectangular shaped bottom tray comprising a central bottom panel and having hingedly attached thereto a plurality of bottom side panels;
        (1) each adjacent pair of bottom side panels having hingedly attached thereto a pair of gusset panels, hingedly attached to each other and to the bottom side panels;
    (b) a generally rectangular shaped upper lid for positioning over the bottom tray, comprising a central top panel and having at least three top side panels hingedly attached thereto;
        (1) a pair of three directional reverse cuts, forming a tear-off portion, positioned on the upper lid and initiating at an edge of one top side panel and running in a first direction to a central portion upper edge of an adjacent side panel, thereafter running in a second direction on the top panel in juxtaposition to the adjacent side panel edge and thereafter running in a third direction and terminating in the central portion of the top side panel opposite to the top side panel where the reverse cuts initiated, the reverse cuts so positioned and running in the first and third directions forming triangular shaped corner reinforcements on the upper lid located at each corner of the lid, the reverse cuts running in the second direction also forming an elongated section in the second direction on two opposite sides of the carton, the two elongated sections being substantially parallel to each other and connecting the triangular shaped corner reinforcements; and
        (2) adhesive means, associated with the upper lid and the bottom tray for fixedly adhering the top side panels of the upper lid to at least three bottom side panels of the bottom tray whenever the upper lid has been positioned over the bottom tray, the adhesively glued upper lid and bottom tray forming rigid double thickness side panels on at least three of the sides of the paperboard carton, the pair of three directional reverse cuts forming the triangular shaped corner reinforcements along with the substantially parallel elongated sections in combination with the glued upper lid and bottom tray serving to improve the twisting tendencies of the carton whenever the tear-off portion on the upper lid is removed leaving the triangular shaped corner reinforcements and the substantially parallel elongated sections intact as a unit and whenever the carton is removed from an oven thereby improving torsional stability of the package when used.

2. The paperboard carton as defined in claim 1 wherein at least two of the plurality of top side panels have hingedly attached thereto a plurality of flaps and further comprising the flaps being adhesively secured to the adjacent top side panels.

3. The paperboard carton as defined in claim 1 further comprising the pair of reverse cuts terminating in the central portion in a spaced relationship and further comprising a perforated score being formed between the terminated reverse cuts for hinging the tear-off portion when desired and for tearing off the tear-off portion when desired.

4. An improved upper lid for use with an improved ovenable paperboard carton for use in a microwave and conventional oven, comprising a generally rectangular shaped upper lid for positioning over and adhesively securing to a bottom tray and comprising a central top panel and having a plurality of top side panels hingedly attached thereto;
    (a) a pair of three directional reverse cuts, forming a tear-off portion, positioned on the upper lid and initiating at an edge of one top side panel and running in a first direction to a central portion upper edge of an adjacent side panel, thereafter running in a second direction on the top panel in juxtaposition to the adjacent side panel edge and thereafter running in a third direction and terminating in the central portion of the top side panel opposite to the top side panel where the reverse cuts initiated, the reverse cuts so positioned and running in the first and third directions forming triangular shaped corner reinforcements on the upper lid located at each corner of the lid, the reverse cuts running in the second direction also forming an elongated section in the second direction on two opposite sides of the carton, the two elongated sections being substantially parallel to each other and connecting the triangular shaped corner reinforcements; and
    (b) at least two of the plurality of top side panels having hingedly attached thereto a plurality of flaps and further comprising the flaps being adhesively secured to the adjacent top side panels.

5. The improved upper lid as defined in claim 4 for use with an improved ovenable paperboard carton for use in a microwave and conventional oven further comprising the pair of reverse cuts terminating in the central portion in a spaced relationship and further comprising a perforated score being formed between the terminated reverse cuts for hinging the tear-off portion when desired and for tearing off the tear-off portion when desired.

* * * * *